US00RE34188E

United States Patent [19]

Kuzyk et al.

[11] E Patent Number: Re. 34,188

[45] Reissued Date of Patent: Mar. 2, 1993

[54] AUTOMATIC FILM PROCESSORS

[75] Inventors: Roman Kuzyk, 55 Florister Dr., Trenton, N.J. 08690; Lewis M. Edwards, Trenton, N.J.

[73] Assignee: Roman Kuzyk, Trenton, N.J.

[21] Appl. No.: 564,836

[22] Filed: Aug. 9, 1990

Related U.S. Patent Documents

Reissue of:

[64] Patent No.: 4,890,131
Issued: Dec. 26, 1989
Appl. No.: 316,772
Filed: Feb. 28, 1989

[51] Int. Cl.[5] ..... G03D 3/06

[52] U.S. Cl. ..... 354/299; 354/323; 354/324; 354/330

[58] Field of Search ..... 354/299, 323, 324, 330, 354/329, 312, 307

[56] References Cited

U.S. PATENT DOCUMENTS

| | | | |
|---|---|---|---|
| 3,698,307 | 10/1972 | Reichardt . | |
| 4,035,818 | 7/1977 | King | 354/323 |
| 4,131,868 | 12/1978 | Dombrowski et al. . | |
| 4,248,514 | 2/1981 | Watkins | 354/299 |
| 4,302,092 | 11/1981 | Ashton et al. | 354/329 X |
| 4,453,817 | 7/1984 | Clark | 354/299 |
| 4,586,805 | 5/1986 | Bockemuhl-Simon et al. | 354/323 |
| 4,634,251 | 1/1987 | Jonker | 354/323 X |
| 4,888,607 | 12/1989 | Stutz et al. | 354/323 |

FOREIGN PATENT DOCUMENTS

| | | |
|---|---|---|
| 2735447 | 2/1978 | Fed. Rep. of Germany . |
| 2383535 | 6/1985 | France . |
| 2583535 | 12/1986 | France . |

OTHER PUBLICATIONS

"Photo-Therm", Sales Bulletin, Nov. 1986.
Schematic Representation of the ADP-12, 1986.

*Primary Examiner*—A. A. Mathews
*Attorney, Agent, or Firm*—Longacre & White

[57] ABSTRACT

An automatic film processor for processing roll, sheet or disk film houses the film to be developed, which is disposed in a light tight housing, preheats the chemical solutions to the proper temperature and pumps them, in turn, into the reservoir formed by the base of the removable film drum in which the film is positioned and provides rotary and linear agitation for the film. The machine includes a linear selective valve capable of selecting any one of a plurailty of chemical solutions for use in developing of the film and carefully purges the system prior to preheating and supplying the next chemical for use in the developing process.

8 Claims, 5 Drawing Sheets

AUTOMATIC FILM PROCESSORS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to film processing machines and more particularly, to an automatic film processing machine that can supply a plurality of chemicals for different processes to the film to be developed and carefully purges the last used chemical from the system prior to supplying the next needed chemical.

2. Discussion of the Relevant Art

The art abounds with automatic film processing machines suitable for handling developing of particular types of roll or disk films. The developing process requires chemical solutions, the pre-heating of these solutions and applying the chemical solutions to the film to be developed in a light tight environment. The process is enormously time consuming, requiring critical temperature maintenance, and also requires that prior to applying a new chemical solution to the system, the old chemical solution must be completely purged. All of these steps must be performed carefully. However, all existing machines require extended warm up times prior to beginning a process. The instant, invention quickly heats only the small amount of solution needed for a particular step of the process. Known apparatuses require pressurized tepid water for washes while the instant invention treats water as just another chemical solution, heating it as required, therefore, eliminating a need for tepid water. A pressurized water source is not needed with the instant invention since the water is pumped into the reservoirs, making it easier to set up the apparatus in the field.

Most existing machines are set up to perform one process at a time, thus requiring cleaning of the apparatus, refilling the apparatus with different chemical solutions for another process and an extended time to stabilize the temperatures of the apparatus and the solutions for the new process. Moreover, the replacing of chemical solutions is unwieldy and dangerous in that contamination can occur, which will then ruin the film being processed. The apparatus of the instant invention has disposed therein and/or access to all the solutions needed for color slide, color negative and black and white films. The operator of the apparatus can select the process desired by activating a switch which provides for the proper chemical solution at the required temperature at the proper time with the desired agitation to obtain perfect results.

In particular, with the advent of color film the number of chemical solutions and the accuracy of the temperatures required, in order to obtain satisfactory results are critical for reliable film developing.

Therefore, it is an object of the present invention to overcome the shortcomings found in the prior art by providing a fully automatic system capable of use by non-technical persons.

It is another object of the present invention to provide a compact developing apparatus which provides and requires a minimum of knowledge of the operator thereof.

It is still yet another object of the present invention to provide a compact, completely automatic developing apparatus that provides the ability of quickly heating small amounts of solution at any one time.

It is still yet another object of the present invention to provide a cost effective compact completely automatic developing apparatus that is within the price range of individuals as well as small development labs.

SUMMARY OF THE INVENTION

An automatic film processor for processing roll or disk film according to the principles of the present invention, comprises in combination, a removable drum device for storing the undeveloped film in a light free chamber and includes a single coupling connector port which is used for the ingress and egress of chemical solutions, a mounting apparatus for mounting the film therein which is provided with an agitating coupling means disposed on the distal end of the mounting device and extends external to the drum. The removable drum includes a first reservoir which receives a plurality of chemical solutions to cover a portion of the removable drum. A housing receives the removable drum and is provided with a single mating coupling connector port also used for the ingress and egress of the chemical solutions. A heater and blower is disposed in the housing and provides a stream of heated air over the housing in order to maintain the film to be developed at a constant temperature. A driver motor disposed on the housing has a rotary output shaft which mates with the agitating coupling provided on the film mounting device and provides both rotary and longitudinal motion to the film. A linear valve apparatus, is disposed within the housing and has a single egress port and a plurality of ingress ports, each of the ingress ports are individually selectable and coupled to the chemical solutions. A valve motor disposed in the housing is coupled to the linear valve and controls the selection of only one chemical solution at a time. A second reservoir, disposed in the housing, stores one of the liquid chemicals at a time which is heated and stirred therein to a prescribed temperature and is pumped, via an additional pump into the first reservoir after the system is purged of the prior chemical solution that was used. All of the above steps are timed and controlled by a control device circuit arrangement.

The foregoing and other objects and advantages will appear from the description to follow. In the description, reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it now will be described, by way of example, with reference to the accompanying drawing in which.

DESCRIPTION OF THE PREFERRED EMBODIMENT

Figure 1:
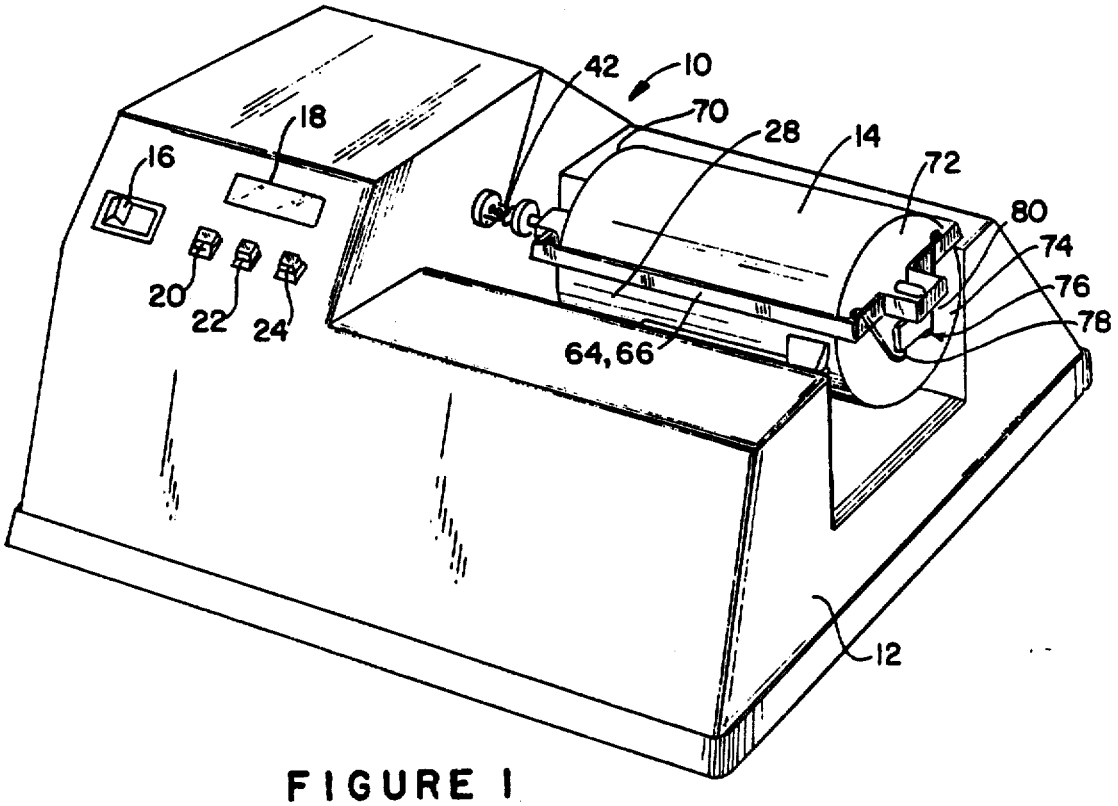
FIG. 1 is a pictorial representation of an automatic film processor, according to the principles of the present invention.

Referring now to the figures, and in particular to FIG. 1, there is shown an automatic film processor 10, according to the principles of the present invention which includes a housing 12 and a removable drum 14 into which may be loaded multiple rolls of film or a plurality of disks, not shown, for processing. The housing 12 in addition to including the necessary circuitry for automatically controlling and performing the necessary steps for the development of film includes, as one might expect, an on/off switch 16, a liquid crystal display 18 which may indicate which step in the process is being performed at the present time and the amount of time remaining in the selected step as well as indicator switches 20, 22 and 24 for selecting operating functions, film type, developing time for modifying the standard process.

Figure 2:
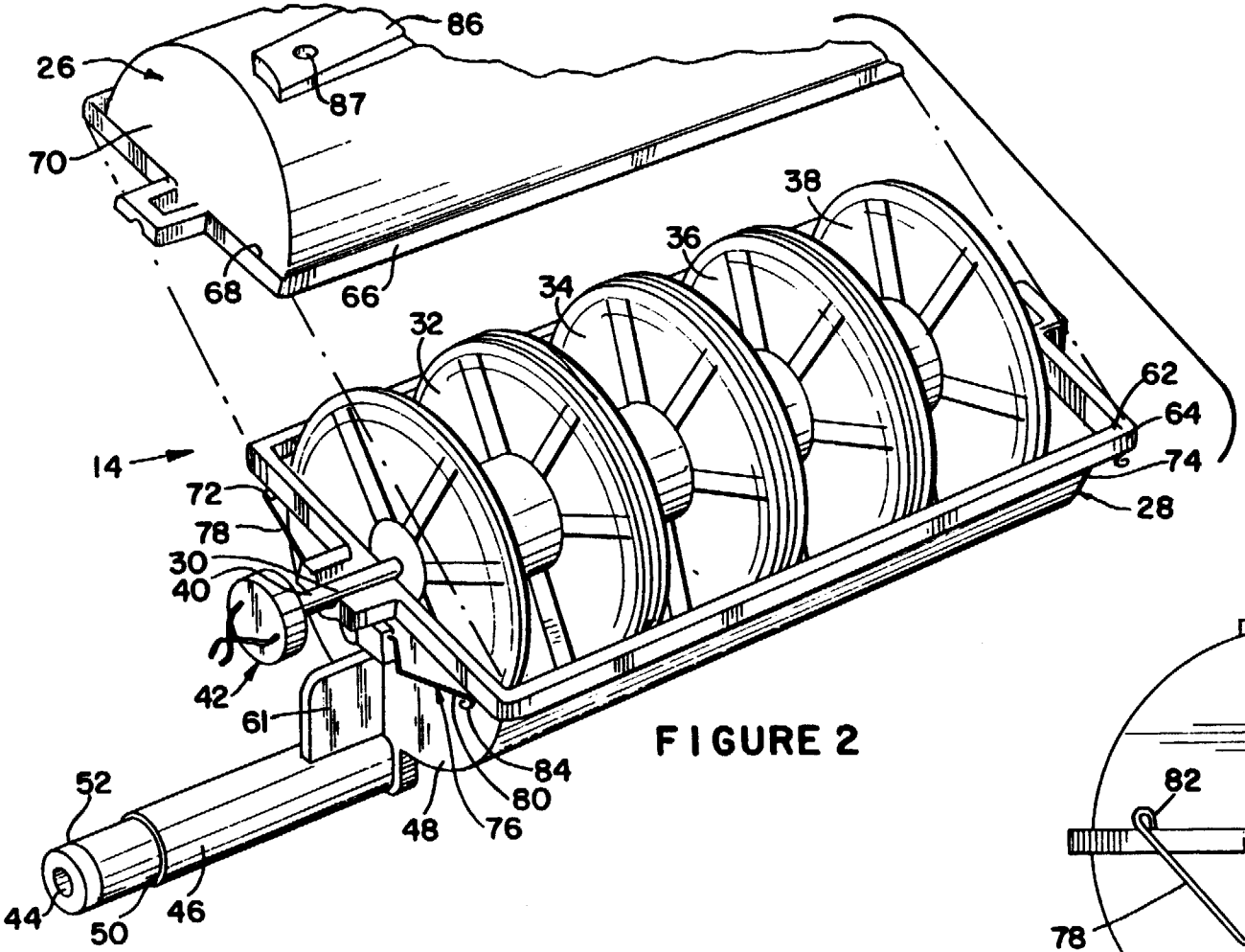
FIG. 2 is an enlarged isometric exploded view of the film storage drum.

The drum 14 is removable and is more clearly shown in FIG. 2 with its cover member 26 removed from the base member 28. Installed on the base member 28 on a removable mounting shaft 30 are a plurality of conventional film loading reels 32, 34, 36 and 38 which slide onto shaft 30 in a conventional manner and will rotate therewith. Disposed on one end 40 is an agitating coupling device 42, which will be explained in more detail hereinafter. Also provided in base member 28 is a coupling connector port 44 utilized for the ingress and egress of chemical solutions. The port or aperture 44 is provided in a longitudinally extending member 46 extending from one end 48 of base member 28. Extending member 46 is also provided with at least one O-ring 52 and may include a second O-ring 50 to insure proper seating and snug fitting within the mating coupling connector 54 (shown in FIG. 4) disposed within the housing 12.

Member 46 may be integrally molded in base member 28 or may be a hollow cylindrically-shaped member formed separately and held therein by conventional means, such as glue, epoxy, etc. 58. When member 46 is inserted into base member 28 a right angle fluid flow path in chamber 60 is provided in order to maintain the housing's light tight integrity so that light appearing through the coupling connector port 44 cannot reach the film placed on the reels 32, 34, 36 and 38 prior to insertion into the mating coupling 54 (see FIG. 5). An extending thumb tab 61 is affixed between end 48 of base member 28 and extending member 46 which acts as reinforcement because of the right angle joint made therein and it also helps when an individual installs the extending member 46 into its mating coupling 54.

In order to maintain the light tight integrity of the drum 14 the edges 62 of base member 28 is provided with an upwardly extending wall 64 completely surrounding the base member and which is designed to cooperate with and receive a corresponding protruding edge or lip 66 provided on the cover 26. Edge 66 also has a channel 68 provided therein, particularly along its front wall 70 and rear wall 72. Base member 28 is adapted to receive cover member 26 thereon and with the overlapping of wall 64 with edge 66 the light tight integrity of the drum 14 is maintained.

Figure 3:
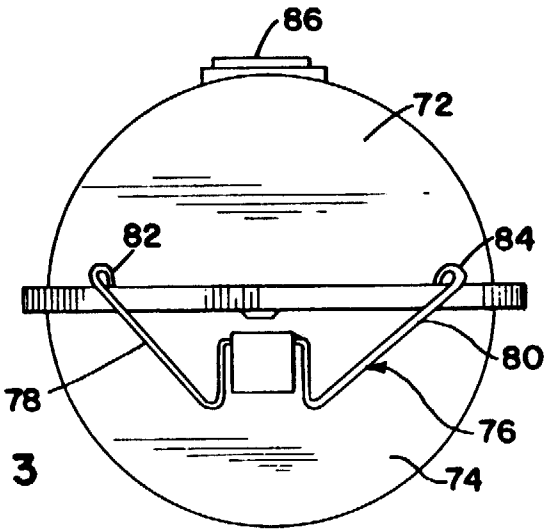
FIG. 3 is an end view in elevation of the film drum storage disclosing the means for retaining the cover on the base of the drum.

Affixed on the front end wall 48 and on the rear end wall 74 of base member 28 is a generally W-shaped wire spring clip 76 (see FIG. 3), having arms 78 and 80. The extending distal ends 82 and 84, respectively, are preferably curved to engage the channel 68 provided on the cover member 26 to retain the cover member 26 on the base member 28 during the agitation of the mounting shaft with the film reels thereon while processing the film.

The identical spring clip 76 is affixed to the front end of base member 28 and functions in the same manner as the spring clip 76 mounted on the rear wall 74 of base member 28. Cover member 26 may be provided with a light trap air vent 86 which is provided with a through aperture 87.

Figure 4:
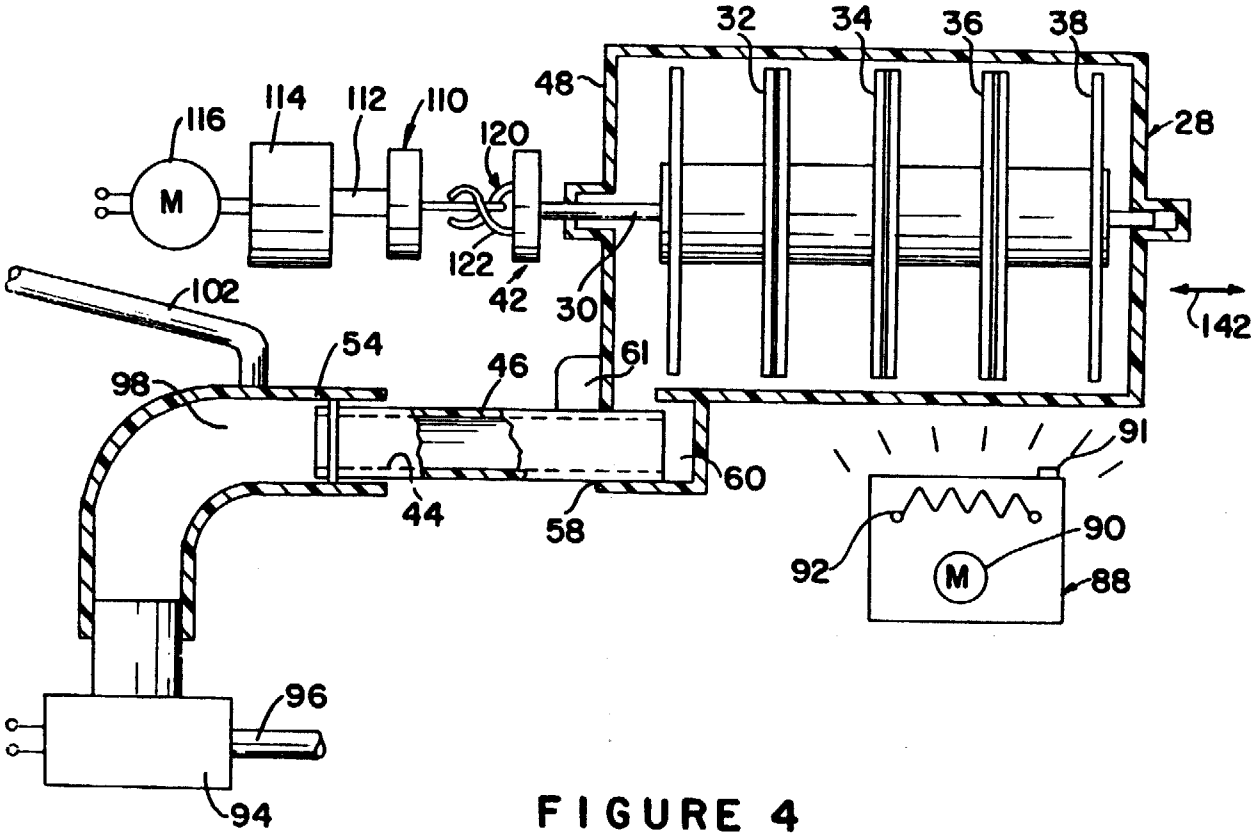
FIG. 4 is a pictorial representation partially in cross-section of the film drum storage connected to the agitating motor and depicting the method of feeding the chemical solutions to the film processing reservoir.

Referring now to FIG. 4 which is a pictorial representation partially in cross-section of the base member 28 inserted into the housing coupling 54 in the normal position for operation. The housing 12 includes a blower assembly 88 which includes a motor 90 and a heater element 92 and may include a temperature sensor 91 in order to control the temperature of the air being supplied over the drum to maintain the temperature of the drum and the chemical solution therein at the proper operating temperature during the agitation of the drum 14 for each of the processing steps. The temperature sensing device 91 maintains the air temperature at the proper operating value and if the air temperature gets too high, the central computer control device 100 will reduce the current being coupled into the heater element 92, thereby maintaining the air temperature at the value desired.

A purging valve 94 controlled by the central computer control device 100 operates to purge the system of any chemical solutions when activated and will drain any of the chemical solution remaining in base member 28 or disposed in extending member 46 as well as any chemical appearing in the input orifice 98 and mating coupling 54. Purge valve 94 is provided with an output hose connection 96 which may go to a waste reservoir, not shown, or if a continuous process, wherein the same chemical can be reused it may be filtered and added to the source of the chemical solution. The mating coupling 54 has proximate thereto an input orifice 98 into which is coupled a hose 102 which is coupled to pump 104 that is coupled, via hose 106, to pre-heating reservoir 108 shown in FIG. 6.

Figure 5:
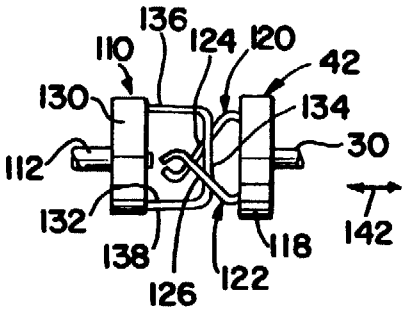
FIG. 5 is a partial view of the coupling mechanism shown in FIG. 5 rotated 90 degrees for a clearer view thereof.

Referring now to FIGS. 4 and 5 there is shown an enlarged pictorial representation of the agitating coupling device 42 which is adapted to mate and cooperate with a cooperating agitating coupling device 110. The couplings shown in FIG. 5 are rotated 90 degrees from the couplings shown in FIG. 4. The agitating coupling 42 provided on shaft 30 may be, for simplicity in discussion, designated a female connector, whereas the cooperating connector 110 may be deemed a male connector and is mounted on the shaft 112 coupled by gear train 114 to a driving motor 116 controlled by the central computer control device 110.

Figure 5A:
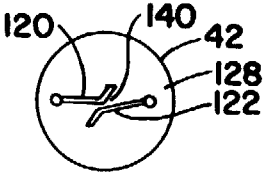
FIG. 5A is a top plan view of the female agitating coupling device affixed on a removable mounting shaft disposed within the housing.

Male coupling 42 is seen to include a base member 118, preferably round, and a pair of generally S-shaped wire members 120 and 122, each having a generally straight central portion 124 and 126, respectively. One end of each S-shaped wire member is affixed within the base member 118 proximate the edge 128 of the base member 118. The other end of each of the S-shaped wire members 120 and 122 extending longitudinally outwardly so that they are in close proximity to each other as shown in FIG. 5A.

The cooperating male connector 110 includes a base member 130 and a generally U-shaped wire member 132 which is provided with a generally centrally disposed flat portion 134 and two arm portions 136 and 138. Flat portion 134 of the U-shaped wire member 132 is adapted to fit between the opening or space 140 provided between S-shaped members 120 and 122 (see FIG. 5A). When male coupling 110 is inserted between S-shaped members 120 and 122 and rotated it becomes obvious that female member 42 will also be rotated in the same direction and speed. However, what is not generally obvious is that, because of the permitted play and looseness of connection between the male and female couplings 110 and 42, respectively, and with the male coupling, being rigidly fixed within the housing with regard to lateral movement, will cause the flat portion 134 to move along the straight portions 124 and 126 of female coupling 42, thus supplying lateral motion in the direction of arrow 142 every time the motor 116 is energized in one direction and then the direction thereof is reversed. Thus, the drive motor 116 imparts both rotary motion and longitudinal motion to shaft 30 and the reels 32, 34, 36 and 38 affixed thereon.

Figure 6:
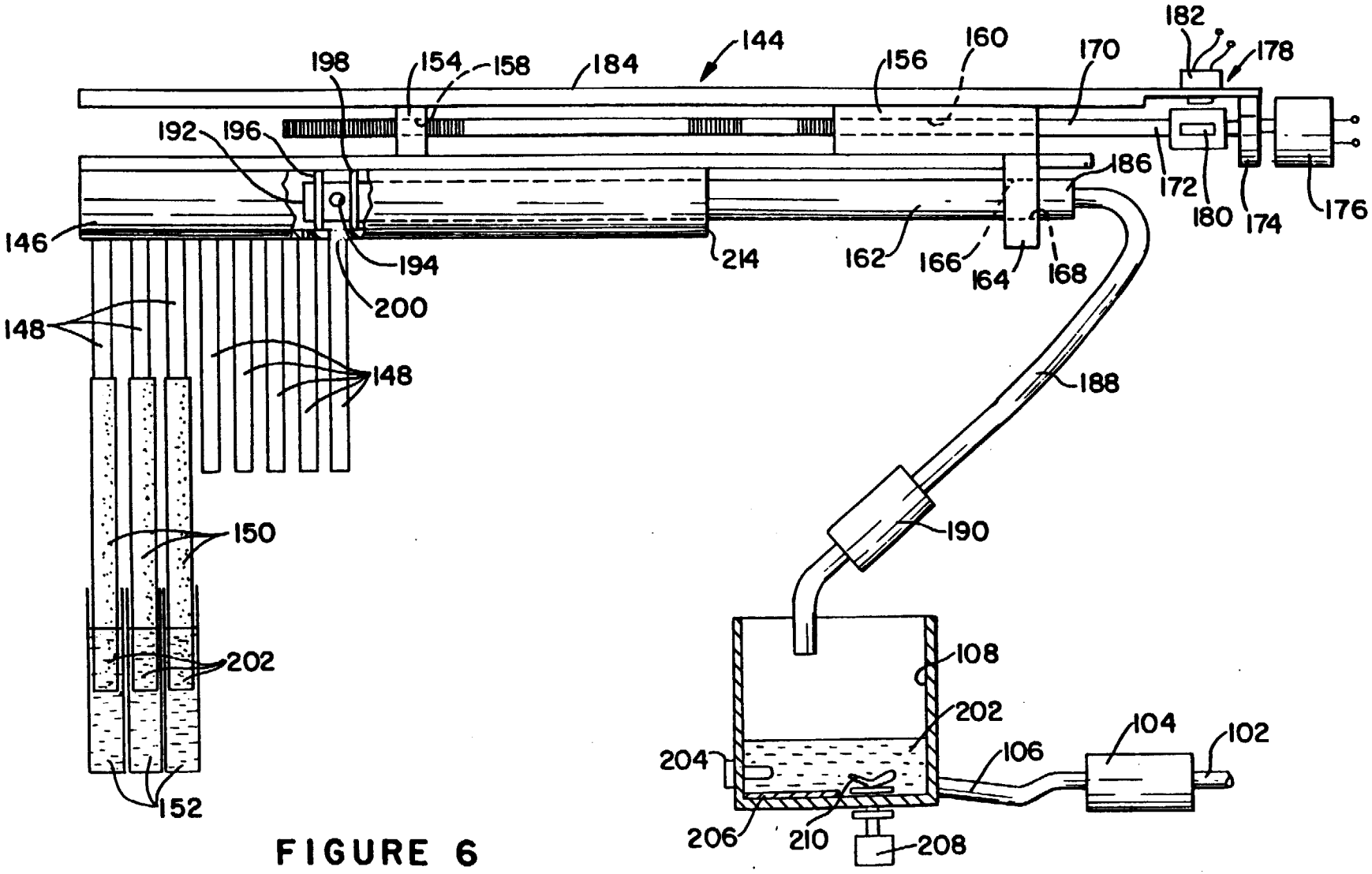
FIG. 6 is an enlarged pictorial representation of the linear valve and reservoir and pumping arrangements for moving the chemical solutions from their reservoirs towards the film immersion reservoir.

Referring now the FIG. 6, which is a pictorial representation in elevation of the linear valve device 144 that includes the hollow elongated housing member 146 that is provided with a plurality of input ports 148, each of which is connected by a plurality of hoses 150 to independent reservoirs 152 containing different chemical solutions therein, which have been previously prepared for operation in the present automatic apparatus. Housing member 146 is provided with a transversely disposed support members 154 and 156. Support member 154 is provided with a clearance aperture 158 and support member 156 is provided with a threaded aperture 160. Support member 156 is rigidly attached to a hollow elongated plunger member 162, in a conventional manner, such as by an extending sandwich member 164 provided with two semi-circular shaped openings adapted to receive the plunger 162 therein and thereafter closed by glue, epoxy or clamping device, not shown.

A threaded rod 170 adapted to be received in threaded aperture 160 and clearance aperture 158, is attached at one end 172, via a gear train 174, to a drive motor 176 which is in turn coupled to the central computer control device 100. A revolution sensing device 178 has one portion thereof 180 affixed on the threaded shaft 170 with the other portion thereof 182 affixed on a mounting base portion 184 of housing member 146. Thus each revolution of the shaft may be sensed by sensor 178 having its electrical output coupled to the central computer 100 which will monitor the number of revolutions of the threaded rod 170 so that the plunger member 162 may be accurately positioned with regard to the plurality of input ports 148.

Plunger 162 on one distal end 186 is coupled, via a hose 188 and pump 190, to the pre-heating reservoir 108. The other end 192 of plunger member 162 is sealed or closed off. Proximate end 192 an orifice 194 is provided. One either side of orifice 194 are disposed a pair of rubber grommet or O-ring members 196 and 198 in a conventional manner. Thus, it can be seen that when orifice 194 is directly adjoining the input ports 148 the chemical solution 202 disposed in the reservoirs 152 will have a continuous fluid flow path, via hose 150, input port 148, orifice 200, orifice 194 through the hollow plunger 162 through hose 188 and pump 190 to reservoir 108.

Once the chemical solutions 202 reach reservoir 108 under the control of the central computer 100 they would be heated to the proper operating temperature, as sensed by the temperature sensor device 204 which provides a signal to the central computer 100 which maintains the solution at the required temperature. Thus, the heating element 206 provided in the reservoir 108 would be turned off by the computer 100, allowing the chemical solution 202 to remain at the proper operating temperature. To insure that the chemical solution is uniform in temperature, it is agitated by a motor 208 which is magnetically coupled to an impeller portion 210 that is rotated to insure even heat distribution within the chemical solution. A level sensor, not shown, may also be utilized to further indicate the central computer 100 that the proper level of chemical solution is in the reservoir before starting the heating cycle. This may be accomplished by sensing the fluid level and turning off pump 190 when it has reached a desired level or alternatively, by allowing the pump 190 to operate for a fixed amount of time. It is also to be noted that one of the chemical solutions may be plain water.

Figure 7:
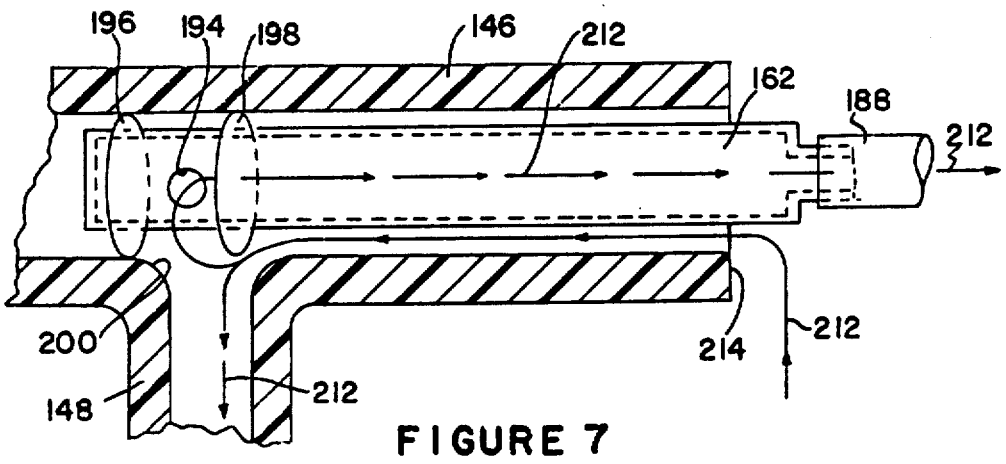
FIG. 7 is a greatly enlarged view of a portion partially in cross-section of the linear valve showing the method of purging the chemical solution from the system.

To insure that there is no remaining chemical solution from a prior step left in the system before the next chemical is added, the automatic film processor 10 provides for the purging of prior chemicals which is explained in detail with reference to FIG. 7 which shows an enlarged partial cross-sectional view at the point when the plunger orifice 194 is juxtaposed the orifice 200 provided in the input ports 148. It is to be noted that during the movement of plunger 162 from one input port to another, the rubber grommets 196 and 198 are in such a position wherein grommet 196 is disposed along one edge of orifice 200 and the second grommet 198 is disposed over the opening or orifice 200, thereby providing an air path in the direction of arrow 212 such that any chemical solution remaining in input port 148 falls by gravity back into the reservoir 152. With pump 190 remaining on, it will suck any chemical solution remaining in hose 188 into the reservoir and also causes air surrounding the end 214 of housing member 146 to flow through orifice 194 provided in plunger 162, thus purging both the plunger and the hoses 188 and 148 of any chemical solution that may be disposed therein.

Figure 8:
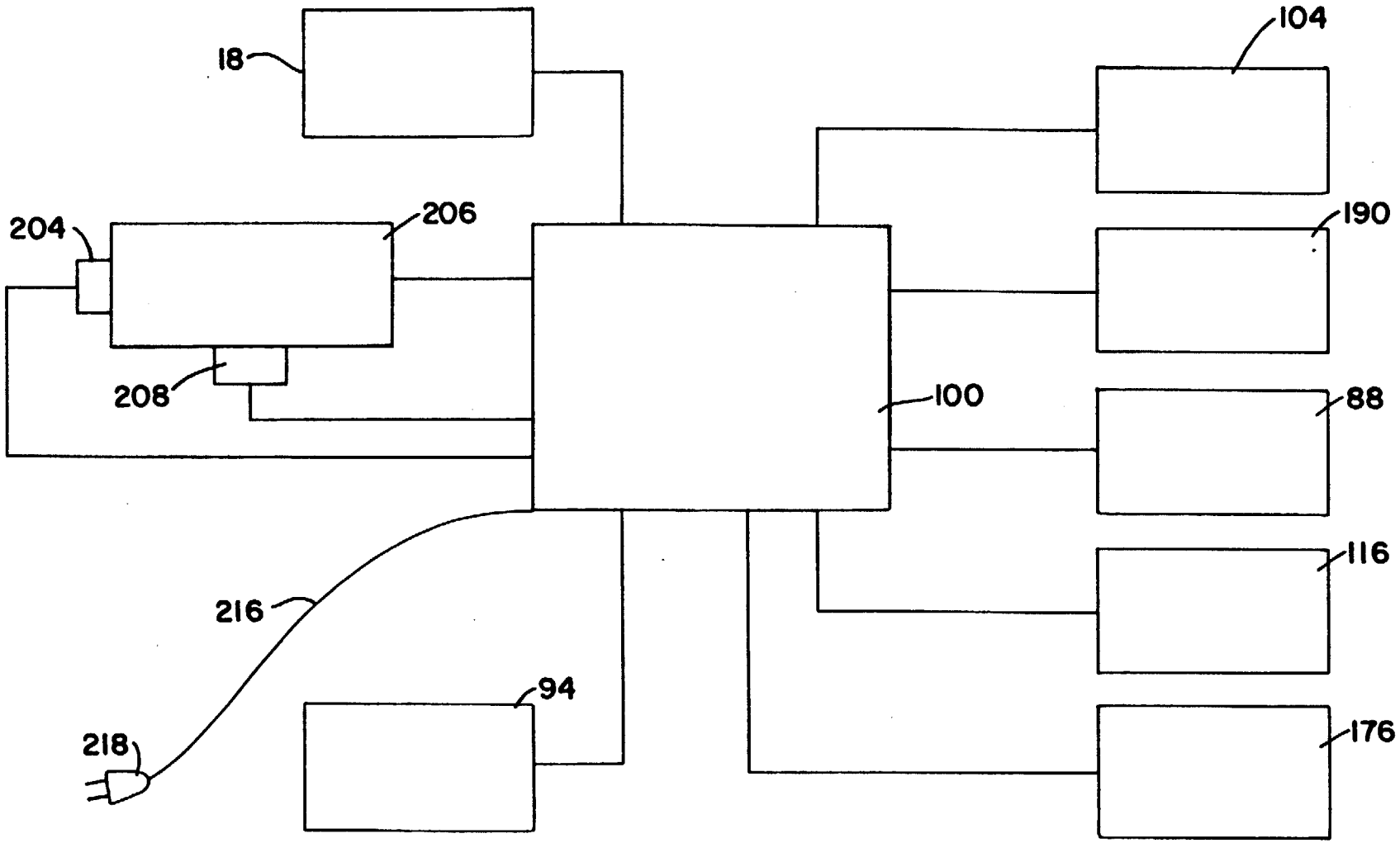
FIG. 8 is a functional block diagram of the controlling apparatus for the automatic film processing apparatus of the instant invention.

Referring now to FIG. 8 which shows the functional block diagram of the automatic film processing apparatus according to the principles of the present invention. A central computer control device 100 controls the functioning of the system and provides for the operation of each of the particular components. The central computer control 100 includes conventional logic memory apparatuses and its own inherent power supply which is coupled, via a line cord 216 and plug 218 to a conventional source of AC voltage, not shown. The computer also provides for energizing voltage for pumps 104 and 190, the heater and blower assembly 88, the film agitation motor 116, the linear valve motor 176, liquid crystal display 18, the reservoir heater 206, temperature sensor 204 and agitator motor 208 and the purge valve 94, and are all controlled through the central computer and function in accordance with a software program, all of which is conventional and known in the art. Each of the components utilized herein are of standard components. The drive components and sensors are standard components which may be readily purchased. The linear control valve has been described herein in detail since it is not a part which may be purchased but has been conceived by the inventor herein.

Hereinbefore has been disclosed an automatic film processing apparatus which is small in size, and ideally suitable for performing multiple control steps for different photo processes requiring a plurality of chemical solutions to be provided in sequence at predetermined control temperatures which may be utilized by individuals with a minimum knowledge in the art. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. An automatic film processor for processing roll, sheet or disc film comprising, in combination:

A. [removable] drum means for storing said [undeveloped] film in a light free chamber, said drum means including;

(a) a [single coupling] connector port means utilized for the ingress and egress of chemical solutions, *and*

(b) removable mounting means for mounting said film [therein, said mounting means including, (i) an agitating coupling means disposed on one distal end and extending external to said drum means; and (c) a first reservoir, said first reservoir being adapted to receive a plurality of chemical solutions and said removable mounting means, a portion of said mounting means being submersible in said liquid chemical solutions] *within said drum means*;

B. housing means *for supporting said drum means*, said housing means including;

(a) a [single mating] coupling connector port means for the ingress and egress of said chemical solutions *to said drum;*

(b) [heater and blower means for providing heated air over said drum means;

(c) first drive motor means, said drive motor means being adapted to be connected to a source of electrical power and including;

(i) a rotary output shaft having a mating agitating coupling means disposed on the distal end of said output shaft, said mating agitating coupling being adapted to be coupled to said drum means agitating coupling for transferring rotary and longitudinal motion to said drum means, (d) linear valve] *manifold* means disposed in said housing means, having an egress port *communicating with the coupling connector port means* and a plurality of ingress ports, each said ingress port being individually selectable and coupled to *a source of one of* said chemical solutions;

[(e) valve motor means disposed in said housing means, and coupled to said linear valve means for controlling the selection of only one chemical solution at a time, said valve motor means being adapted to be coupled to said source of electrical power, (f)] (*c*) [a second] reservoir *means* disposed in said housing for storing one of said *chemical solutions* [liquid chemicals] at a time *and having an outlet communicating with said drum means*, said [second] reservoir *means* having;

(i) means for heating said chemical solutions to a prescribed temperature, when said solutions are disposed within said reservoir[, and (ii) stirring means coupled to said chemical solution for stirring said solution to provide a uniform temperature throughout said solution];

[(g)] (*d*) first [pump] *fluid transfer* means [coupled between said linear valve means and said second reservoir means] for *drawing each of* [pumping] said chemical solutions [from] *by vacuum through* said [linear valve] *manifold* means to said [second] reservoir *means*;

[(h)] (*e*) second [pump] *fluid transfer* means *interposed* [coupled] between said [second] reservoir *means* and said *drum* means [first reservoir] for *transferring* [pumping] said heated chemical solutions from said [second] reservoir *means* to said *drum means* [first reservoir]; and

[(i)] (*f*) drain means[, said drain means being] coupled to said *drum means* [first reservoir] for draining said chemical solutions therefrom when required[; and C. control means disposed within said housing for controlling the sequence and timing of each step of the automatic process and the flow of said chemical solutions, to and from said linear valve means, and said first and second reservoirs].

[2. An automatic film processor according to claim 1 wherein said removable drum means, comprises:

(a) a base member, functioning as said first reservoir, having said coupling connector port means extending longitudinally from one distal end, (b) said agitating coupling means being disposed to extend from said base member generally parallel to said outwardly extending coupling connector port means; and (c) cover means adapted to cooperate and cover said base member and maintain a light tight assembly.]

[3. An automatic film processor according to claim 2 wherein said base member further includes a pair of generally W-shaped spring clips, one of said base member, the arms of said generally W-shaped spring clips being adapted to engage and removably retain a channeled ledge provided on said cover means.]

4. An automatic film processor according to claim [2] *1* wherein said coupling connector port means is provided with means for sealing said coupling connector port to prevent said chemical solutions from leaking therefrom.

5. An automatic film processor according to claim 4 wherein said sealing means comprises at least one O-ring.

[6. An automatic film processor according to claim 1 wherein said agitating coupling means comprises:

A. a female portion including;

(a) a pair of, generally S-shaped wire members having a generally straight central portion, (b) a base a member having one end of each S-shaped wire member affixed therein along a straight line, each said S-shaped wire member being disposed proximate the edge of said base member with the other end of each said wire members extending longitudinally outwardly so that they are in close proximity; and B. said cooperating agitating coupling means comprises a male portion including;

(a) a generally U-shaped wire member having a central portion and two arm portion, said central portion being adapted to cooperate with and fit between said S-shaped members, and (b) a base member, the arm portion of said U-shaped wire member being affixed in said male portion base member, wherein when said cooperating agitating coupling is coupled to said agitating coupling and rotated, said cooperating agitating coupling will couple rotary and longitudinal motion to said agitating coupling.]

[7. An automatic film processor according to claim 1 wherein said mounting means includes a plurality of reels each adapted to receive said roll film thereon for processing.]

8. An automatic film processor according to claim 1 wherein said [heater and blower] means *for heating* further includes first temperature sensing means for sensing the temperature of [said heated air provided over] said [drum] *reservoir* means and maintaining the temperature [of said heated air] at the required value.

[9. An automatic film processor according to claim 1 wherein said first drive motor is capable of reversing directions.]

10. An automatic film processor according to claim 1 wherein said [linear valve] *manifold* means comprises:

a. a hollow elongated housing having said plurality of ingress ports linearly disposed along the circumference of said housing, each of said ingress ports being provided with coupling means adapted to receive one end of a hose suitable for carrying *a respective* [said] chemical *solution* [solutions] therethrough, the other end of each said hose being coupled to *the* [a] source of said *respective* chemical [solutions;

b. a hollow elongated plunger member having;

(i) one end adapted to receive a hose thereon for carrying said chemical solutions therethrough, (ii) the other end being sealed and provided with a through aperture proximate thereto, (iii) a pair of O-rings disposed on said elongated member, one of said O-rings being disposed on each side of said through aperture, said O-rings and said elongated member being adapted to be slidably received into said hollow housing, said O-rings preventing said chemical solutions from flowing in a path other than through said through aperture, and (iv) at least one first transverse support member, said first support member being affixed to said hollow elongated member and being provided with a threaded aperture;

c. elongated base means for supporting said housing, said base means including;

(a) a base member, said base member extending longitudinally and having, (i) at least one second transverse support member disposed between said longitudinal base member and said elongated housing, said second transverse supporting member being provided with a clearance aperture, (ii) a channel disposed along the length of said base member adapted to slidably receive the other end of said first transverse support member, and (iii) longitudinally disposed rod means, said rod means being threaded on one end and adapted to cooperate with and be received into said threaded aperture provided on said first transverse support member and said through clearance aperture on said second transverse support member; wherein, rotary movement of said rod means in one direction causes said elongated plunger member to move into said hollow housing and reversing the rotary movement of said rod means causes said elongated plunger member to move in the opposite direction, thereby providing a continuous fluid flow path for said chemical solutions, via said ingress port, said plunger member aperture and said plunger member one end] *solution*.

[11. An automatic film processor according to claim 10 wherein said valve motor means is coupled to said rod means for providing said rotary motion.]

12. An automatic film processor according to claim 1 wherein said [second] reservoir *means includes* stirring means [includes] *comprising*;

(a) a drive motor disposed below the bottom of said [second] reservoir; and (b) an impeller means disposed in said [second] reservoir magnetically coupled to said stirring means drive motor.

13. An automatic film processor according to claim 1 wherein said [second] reservoir means includes;

(a) means for sensing the level of said chemical solution disposed within said [second] reservoir; and (b) sensing means coupled to said first [pump] *fluid transfer* means for stopping said [first pump means from pumping additional amounts of] chemical solution when the proper level is reached.

14. An automatic film processing method utilizing the processor as set forth in claim 1 comprising the following steps:

(a) installing the film to be processed into said [removable] drum means;

(b) placing said drum means upon said housing means so that [said housing cooperating coupling means engages said drum means said agitating coupling means and said cooperating agitating coupling means, coupling means, and] said removable mounting means is disposed in said [first reservoir] *drum means* to be partially covered by a chemical solution when said [first reservoir] *drum means* is filled to an operating level;

(c) preheating said drum means and said film disposed therein to the operating temperature;

(d) purging said [first reservoir] *drum means* of any prior liquid chemical solution remaining therein;

(e) evenly preheating a first chemical solution in said [second] reservoir *means*;

(f) [pumping] *transferring* said heated first chemical solution into said [first reservoir] *drum means* from said [second] reservoir *means* until the operating level of the [first reservoir] *drum means* is reached;

(g) [rotating and] agitating said drum means for a predetermined amount of time;

(h) purging [selector valve] *the manifold means of any prior chemical solution therein during said predetermined amount of time*;

(i) selecting a second chemical solution for preheating *during said predetermined amount of time*;

(j) [pumping] *transferring* said second chemical solution into said [second] reservoir *means through said manifold means* for preheating *during said predetermined amount of time*;

(k) purging said first chemical solution from said [first reservoir] *drum means*;

(l) [pumping] *transferring* said second chemical solution into said [first reservoir] *drum means* until said operating level is reached;

(m) repeating steps (h) through (l) with each chemical solution until all of the required chemical solutions have been utilized;

(n) [removing said drum means from said housing means; and (o)] removing said film from said [housing] *drum* means.

* * * * *